United States Patent
Porat-Stoler et al.

(10) Patent No.: US 11,455,279 B2
(45) Date of Patent: Sep. 27, 2022

(54) DISTRIBUTED DATA DEDUPLICATION REFERENCE COUNTING

(71) Applicant: International Business Machines Corporation, Armonk, NY (US)

(72) Inventors: Asaf Porat-Stoler, Tel Aviv (IL); Yosef Shatsky, Karnei Shomron (IL); Avraham Bab-Dinitz, Rehovot (IL); Omer Haklay, Shoham (IL)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 16/180,880

(22) Filed: Nov. 5, 2018

(65) Prior Publication Data

US 2020/0142974 A1    May 7, 2020

(51) Int. Cl.
  *G06F 16/174*    (2019.01)
(52) U.S. Cl.
  CPC ................................ *G06F 16/1752* (2019.01)
(58) Field of Classification Search
  CPC ... G06F 17/10; G06F 17/1752; G06F 16/1752
  USPC ......................................................... 707/692
  See application file for complete search history.

(56) References Cited

U.S. PATENT DOCUMENTS

| 9,817,865 B2 | 11/2017 | Chambliss et al. |
| 10,013,201 B2 | 7/2018 | Amit et al. |
| 2010/0223495 A1* | 9/2010 | Leppard ................ G06F 11/004 711/E12.001 |
| 2011/0125950 A1 | 5/2011 | Haustein et al. |
| 2011/0131390 A1 | 6/2011 | Srinivasan et al. |
| 2014/0143213 A1* | 5/2014 | Tal ...................... G06F 16/2272 707/692 |
| 2017/0286002 A1* | 10/2017 | Amit ..................... G06F 3/0608 |

FOREIGN PATENT DOCUMENTS

| WO | 2013166599 A1 | 11/2013 |
| WO | 2014164016 A2 | 10/2014 |
| WO | 2015065312 A1 | 5/2015 |

OTHER PUBLICATIONS

Srinivasan, Kiran, et al. "iDedup: latency-aware, inline data deduplication for primary storage.", Fast. vol. 12. 2012., pp. 1-14.

* cited by examiner

*Primary Examiner* — Hosain T Alam
*Assistant Examiner* — Tracy M McGhee
(74) *Attorney, Agent, or Firm* — Kunzler Bean & Adamson

(57) ABSTRACT

Methods that can provide distributed data deduplication reference counting are disclosed herein. One method includes generating, by a processor, a secondary reference in response to a determination that a data chunk is a copy of the primary reference in which the primary reference includes a pointer to an existing data chunk stored on a storage device. The method further includes incrementing a secondary reference counter on the primary reference in response to generating the secondary reference. Apparatus and computer program products that can include, perform, and/or implement the methods are also disclosed herein.

18 Claims, 8 Drawing Sheets

DISTRIBUTED DATA DEDUPLICATION REFERENCE COUNTING

FIELD

The subject matter disclosed herein relates to storage systems and, more particularly, relates to apparatus, methods, and computer program products that can provide distributed data deduplication reference counting.

BACKGROUND

Data deduplication is a technique for reducing the amount of storage space required to store data. Data deduplication identifies chunks of data and saves an original version of the data. Copies of the original data are replaced with a reference (e.g., a pointer) to the original data. Implementing data deduplication often involves using metadata to describe each reference and a reference counter is used to provide deletion criteria for the original data.

In conventional systems, data deduplication is typically performed by comparing a new data chunk to the fingerprints of currently stored data chunks in a fingerprints database to determine a match. In some situations, data deduplication is performed when an existing reference is already known and is stored in memory. In such cases, existing data deduplication solutions usually approach the original data to increment the reference count therein, which involves additional processing time and/or operations (e.g., communication and/or metadata swapping).

BRIEF SUMMARY

Methods, apparatus, and computer program products that can provide distributed data deduplication reference counting are provided. One method includes generating, by a processor, a secondary reference in response to a determination that a data chunk is a copy of the primary reference in which the primary reference includes a pointer to an existing data chunk stored on a storage device. The method further includes incrementing a secondary reference counter on the primary reference in response to generating the secondary reference.

An apparatus includes a reference management module that generates a secondary reference in response to a determination that a data chunk is a copy of a primary reference in which the primary reference includes a pointer to an existing data chunk stored on a storage device. The apparatus further includes a counter module that increments a secondary reference counter on the primary reference in response to generating the secondary reference. In various embodiments, at least a portion of the counter module and/or the reference management module comprises one or more of a set of hardware circuits, a set of programmable hardware devices, and/or executable code stored on a set of non-transitory computer-readable storage mediums.

One computer program product includes a computer-readable storage medium including program instructions embodied therewith. The program instructions are executable by a processor to cause the processor to generate a secondary reference in response to a determination that a data chunk is a copy of the primary reference in which the primary reference includes a pointer to an existing data chunk stored on a storage device. The program instructions further cause the processor to increment a secondary reference counter on the primary reference in response to generating the secondary reference.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
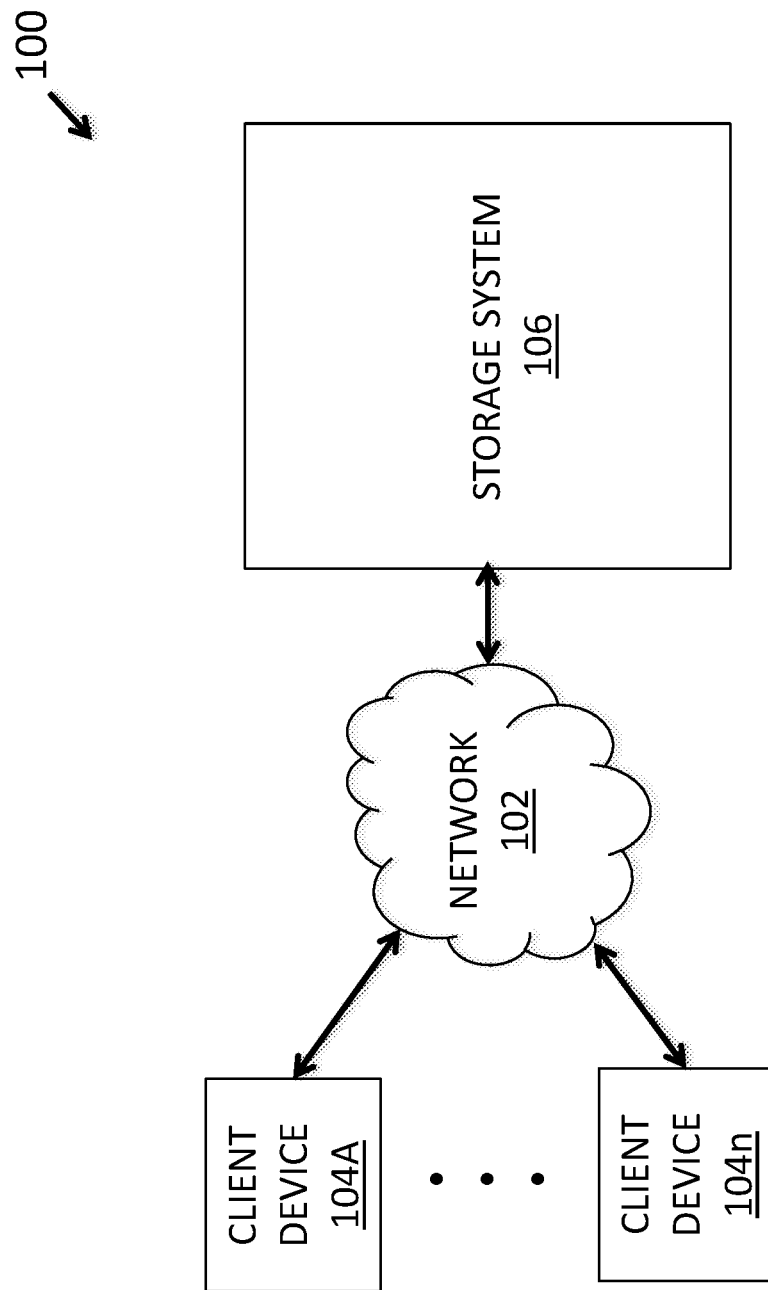
FIG. 1 is a block diagram of one embodiment of a storage network.

Disclosed herein are various embodiments providing methods, systems, and computer program products that can merge protocols for storage networks and systems. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of client devices 104A through 104n (also simply referred individually, in various groups, or collectively as client device(s) 104) and a storage system 106. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the storage system 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 100 via the network 102. Each client device 104, as part of its respective operation, relies on sending I/O requests to the storage system 106 to write data, read data, and/or modify data. Specifically, each client device 104 can transmit 110 requests to read, write, store, communicate, propagate, and/or transport instructions, data, computer programs, software, code, routines, etc., to the storage system 106 and may comprise at least a portion of a client-server model. In general, the storage system 106 can be accessed by the client device(s) 104 and/or communication with the storage system 106 can be initiated by the client device(s) 104 through a network socket (not shown) utilizing one or more inter-process networking techniques.

Figure 2:
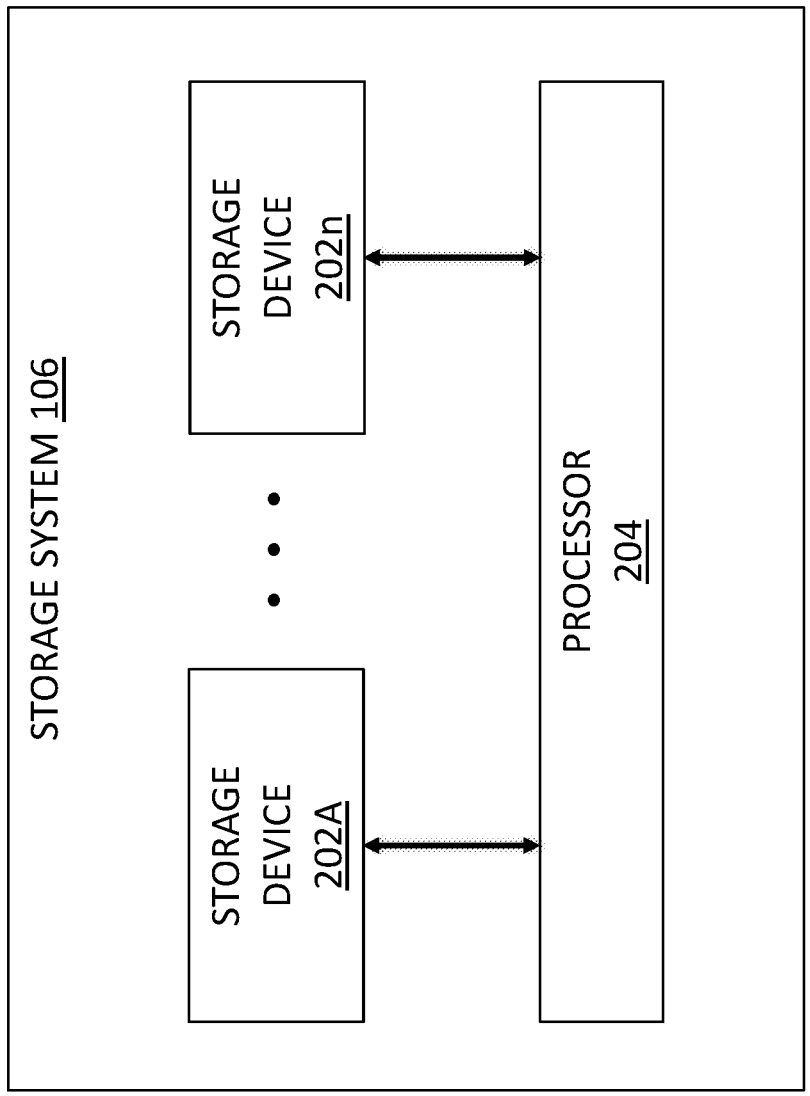
FIG. 2 is a block diagram of one embodiment of a storage system included in the storage network of FIG. 1.

Referring to FIG. 2, Figure is a block diagram of one embodiment of a storage system 106 illustrated in and discussed with reference to FIG. 1. At least in the illustrated embodiment, the storage system 106 includes, among other components, a set of storage devices 202A through 202n (also simply referred individually, in various groups, or collectively as storage device(s) 202) and a processor 204 coupled to and/or in communication with one another.

A storage device 202 may include any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 202 may be implemented as a direct-access storage device (DASD). A storage device 202, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

A storage device 202 may include any suitable size that can provide storage space for one or more storage applications for a set of client devices 104. A storage device 202, in various embodiments, can include a size in the range of about sixty-four kilobytes (KB) to about one hundred terabytes (TBs), among other sizes that are possible and contemplated herein. In some embodiments, a storage device 202 can include a size of about one terabyte, among other sizes that are possible and contemplated herein.

Figure 4A:
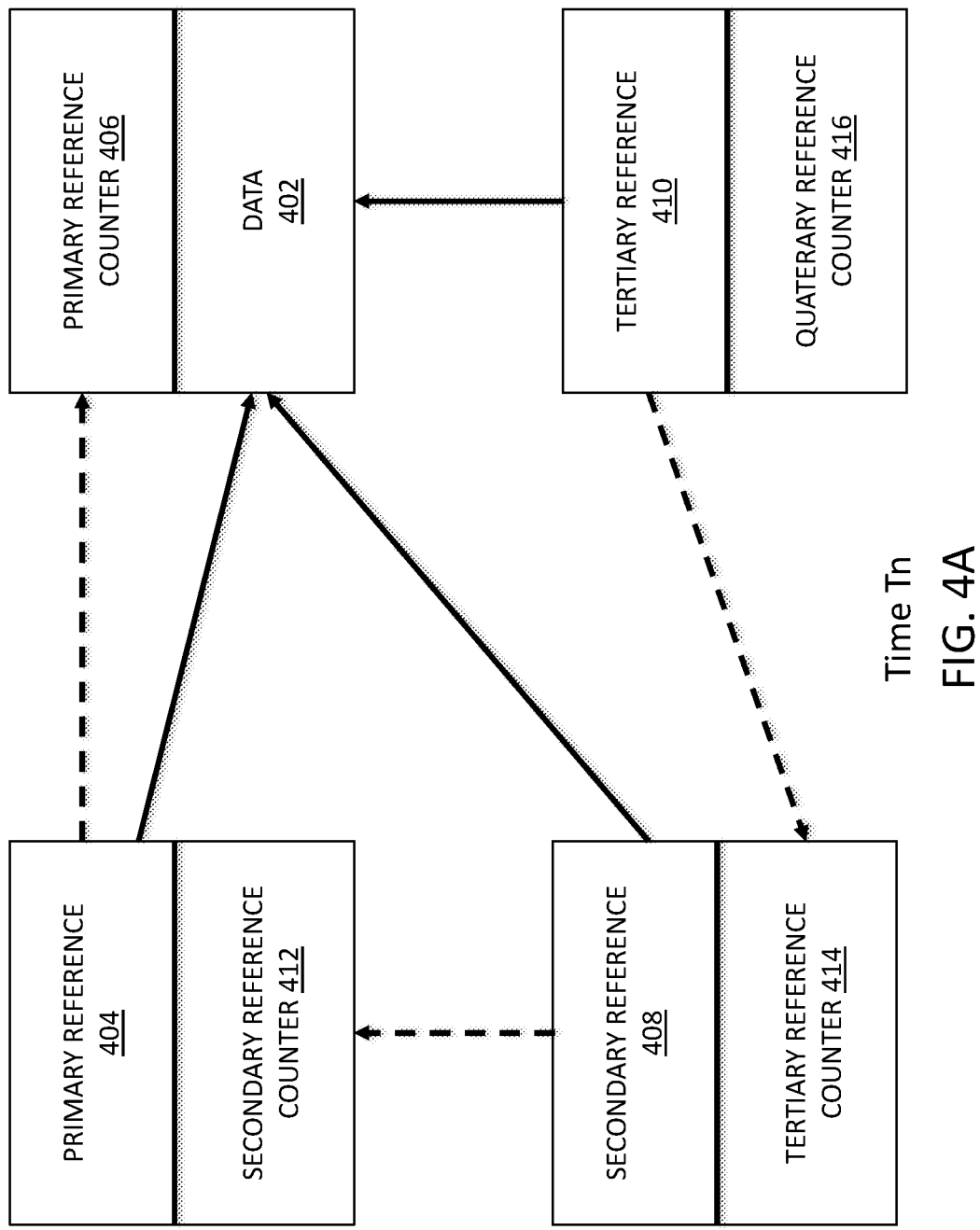
FIGS. 4A and 4B are block diagrams of one embodiment of the storage system of FIG. 2 at different example times.
Figure 4B:
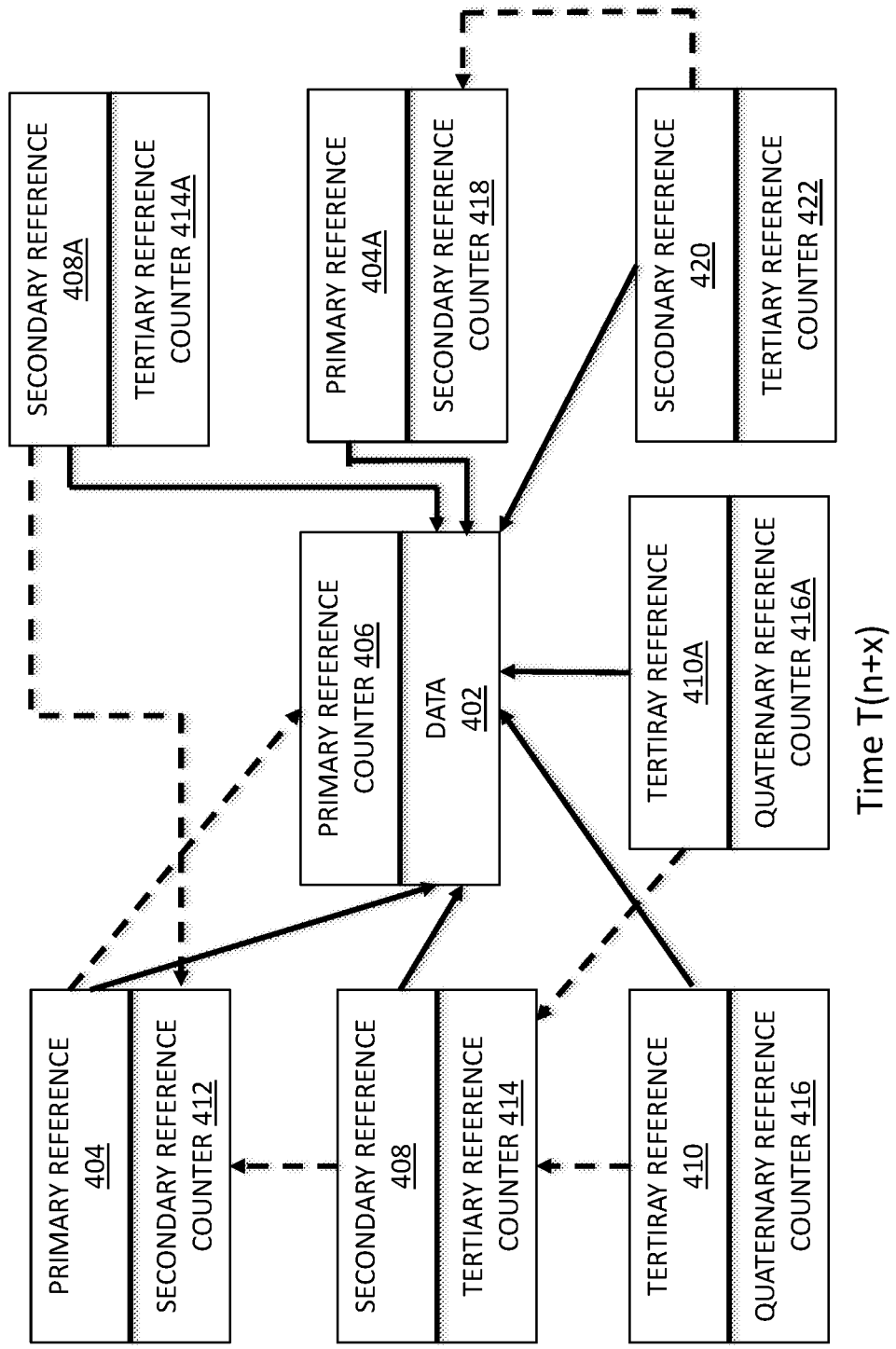

Further, a storage device 202 can store data a set of data blocks, data segments, and/or data chunks (e.g., data chunk(s) 402 in FIGS. 4A and 4B) including any suitable size that is known or developed in the future. In various embodiments, the data block(s), data segment(s), and/or data chunk(s) include a size in the range of about 2 KB to about 64 KB, among other sizes that are possible and contemplated herein. In some embodiments, the one or more data blocks, data segments, and/or data chunks can include a size of about 8 KB, among other sizes that are possible and contemplated herein.

In additional or alternative embodiments, a storage device 202 can store a set of pointers and/or data references (e.g., data reference(s) 406 and/or data reference(s) 408 in FIGS. 4A and 4B). In various embodiments, the pointer(s) and/or data reference(s) can include any suitable size that is known or developed in the future.

In further additional or alternative embodiments, a storage device 202 can store a set of counters (e.g., counter(s) 410 in FIGS. 4A and 4B). In various embodiments, the pointer(s) and/or data reference(s) can include a size in the range of about four bits to about 16 bytes, among other sizes that are possible and contemplated herein. In some embodiments, the one or more pointers and/or data references can include a size of about four bytes, among other sizes that are possible and contemplated herein.

A processor 204 may include any suitable non-volatile/persistent hardware and/or software configured to perform and/or facilitate data storage operations on the storage devices 202, including, but not limited to, data migration, data archiving, data backup, data rebuilding, data mirroring, replicating data, etc. For instance, a processor 204 may include non-volatile and/or persistent hardware and/or software to perform short-term and/or long-term data storage operations on the storage devices 202, which may include write operations, read operations, read-write operations, data migration operations, etc., among other operations that are possible and contemplated herein.

In various embodiments, a processor 204 may include hardware and/or software that can receive I/O requests (e.g., write request, read request, and/or read-write request, etc.) from the client device(s) 104 (see FIG. 1) and perform corresponding I/O operations (e.g., write operations, read operations, and/or read-write operations, etc.) on the storage devices 202 in response thereto. A processor 204 may further include hardware and/or software for executing instructions in one or more modules and/or applications that can provide distributed data deduplication reference counting.

Figure 3:
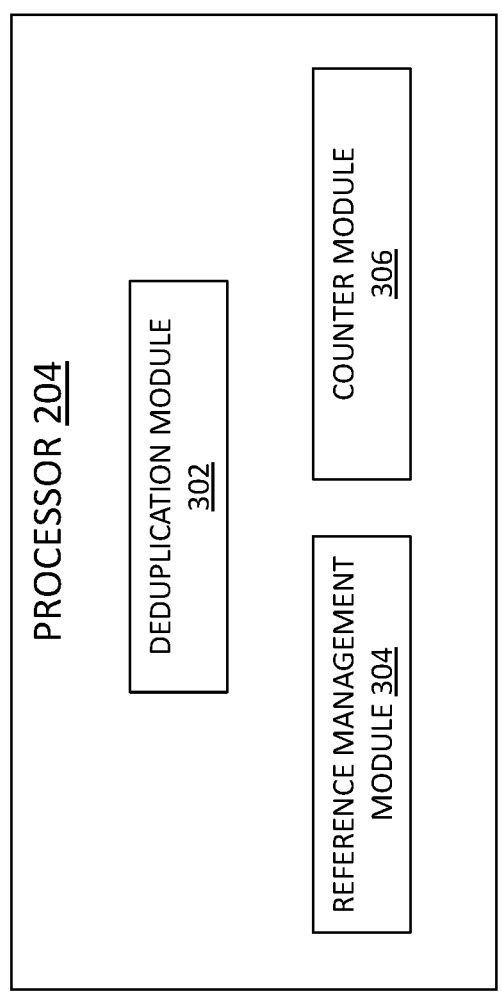
FIG. 3 is a block diagram of one embodiment of a processor included in the storage system of FIG. 2.

With reference to FIG. 3, FIG. 3 is block diagram of one embodiment of a processor 204 that can be included in the storage system 106 illustrated in and discussed with reference to FIG. 2. At least in the illustrated embodiment, the processor 204 includes, among other components, a deduplication module 302, a reference management module 304 and a counter module 306.

A deduplication module 302 may include any suitable hardware and/or software that can implement and/or perform one or more deduplication techniques and/or processes. In various embodiments, a deduplication module 302 can determine whether two or more data chunks, data segments, and/or data blocks already stored in the storage system 106 are duplicates and/or copies of one another. In response to determining that two or more data chunks, data segments, and/or data blocks (e.g., data 402 in FIGS. 4A and 4B) already stored in the storage system 106 are duplicates and/or copies of one another, a deduplication module 302 can replace one of the copies with a pointer and/or primary reference 404 (see FIGS. 4A and 4B) to the data 402.

In additional or alternative embodiments, a deduplication module 302 can determine whether one or more incoming data chunks, data segments, and/or data blocks is a copy of the data 402 already stored in the storage system 106. In response to determining that an incoming data chunk, data segment, and/or data block is a copy of the data 402 already stored in the storage system 106, a deduplication module 302 can store the incoming data chunk, data segment, and/or data block as a primary reference 404 or pointer to the data 402.

In various embodiments, a deduplication module 302 can create and/or associate a primary reference counter (e.g., primary reference counter 406 in FIG. 4A) with the data 402. As discussed elsewhere herein, the primary reference counter 406 can track the quantity of primary references 404 that reference and/or point to the data 402. In other words, the primary reference counter 406 can track the quantity of copies of the data 402 that have been replaced by a primary reference 404.

Further, in response to determining that a data chunk, data segment, and/or data block already stored in the storage system 106 is not a copy of another data chunk, data segment, and/or data block stored in the storage system 106, a deduplication module 302 can maintain storage of the data chunk, data segment, and/or data block in the storage system 106 (e.g., data 402B in FIG. 4B). Moreover, in response to determining that an incoming data chunk, data segment, and/or data block is not a copy of a data chunk, data segment, and/or data block already stored in the storage system 106, a deduplication module 302 can store the incoming data chunk, data segment, and/or data block in the storage system 106 (e.g., data 402B in FIG. 4B).

A duplicate and/or copy of the data 402 already stored in the storage system 106 may be identified and/or detected using any suitable technique that is known or developed in the future. Further, a deduplication module 302 may replace a copy of the data 402 with a primary reference 404 using any suitable technique that is known or developed in the future.

A reference management module 304 may include any suitable hardware and/or software that can control and/or manage one or more references and/or pointers to a data chunk, data segment, and/or data block already stored in a storage system 106 (e.g., data 402). In various embodiments, a reference management module 304 can determine whether two or more references (e.g., primary reference 402, a secondary reference 406, and/or a tertiary reference 408, etc. in FIGS. 4A and 4B) already stored in the storage system 106 are duplicates and/or copies of one another. In response to determining that two or more references already stored in the storage system 106 are duplicates and/or copies of one another, a reference management module 304 can replace one of the copies with a reference and/or pointer to the other reference. In other words, one of the references already stored in the storage system 106 can become a reference and/or pointer to another reference and/or pointer (e.g., a copy of a copy).

In additional or alternative embodiments, a reference management module 304 can determine whether one or more incoming data chunks, data segments, and/or data blocks is a copy of a reference already stored in the storage system 106. In other words, a reference management module 304 can determine whether one or more incoming data chunks, data segments, and/or data blocks is a copy of a copy of the data 402. In response to determining that an incoming data chunk, data segment, and/or data block is a copy of a reference and/or pointer, a deduplication module 302 can store the incoming data chunk, data segment, and/or data block as a reference/pointer to the reference/pointer already stored in the storage system 106.

A copy of a copy of the data 402, whether already stored in the storage system 106 or incoming, may be identified and/or detected using any suitable technique that is known or developed in the future. Further, a reference management module 304 may replace and/or store a copy of a reference with another reference (e.g., create a copy of a copy) using any suitable technique that is known or developed in the future.

In various embodiments, a reference management module 302 can create and/or generate a reference counter (e.g., secondary reference counter 412 in FIGS. 4A and 4B) that is associated with a primary reference 404 (e.g., a pointer). As discussed elsewhere herein, the secondary reference counter 412 can be incremented each time that a duplicate and/or copy of the primary reference 404 (e.g., a copy of a copy of the data 402) is identified/detected as already stored in the storage system 106 and/or is received for storage in the storage system 106.

In additional or alternative embodiments, a reference management module 304 can create and/or generate a secondary reference 406 (e.g., a pointer) that includes a reference counter (e.g., tertiary reference counter 414 in FIGS. 4A and 4B) each time that a duplicate and/or copy of the primary reference 404 is identified/detected as being already stored in the storage system 106 and/or is received for storage in the storage system 106. Here, the secondary reference 408 references and/or points to the data 402 already stored in the storage system 106 and the tertiary reference counter 414 is utilized to track the quantity of tertiary references 410 that reference and/or point to the secondary reference 408.

A duplicate and/or copy of the primary reference 404 may be identified and/or detected using any suitable technique that is known or developed in the future. Further, a reference management module 304 may replace a copy of the primary reference 404 with a secondary reference 408 that includes an associated tertiary reference counter 414 using any suitable technique that is known or developed in the future.

In further additional or alternative embodiments, a reference management module 304 can create and/or generate a tertiary reference 410 (e.g., a pointer) that includes a reference counter (e.g., quaternary reference counter 416 in FIGS. 4A and 4B) each time that a duplicate and/or copy of the secondary reference 408 is identified/detected as being already stored in the storage system 106 and/or is received for storage in the storage system 106. Here, the tertiary reference 410 references and/or points to the data 402 already stored in the storage system 106 and the quaternary reference counter 416 is utilized to track the quantity of quaternary references (not shown) that reference and/or point to the tertiary reference 410.

A duplicate and/or copy of the secondary reference 408 may be identified and/or detected using any suitable technique that is known or developed in the future. Further, a reference management module 304 may replace a copy of the secondary reference 408 with a tertiary reference 410 that includes an associated quaternary reference counter 416 using any suitable technique that is known or developed in the future.

A reference management module 304 can continue to create and/or generate further references (e.g., pointers) to references that include an associated reference counter each time that a duplicate and/or copy of a reference/pointer is identified/detected as being already stored in the storage system 106 and/or is received for storage in the storage system 106. In other words, the various embodiments are limited to including a primary reference 404 with a secondary reference counter 412, a secondary reference 408 with a tertiary reference counter 414, and a tertiary reference 410 with a quaternary reference counter 416.

Further, each duplicate and/or copy of a reference/pointer may be identified and/or detected using any suitable technique that is known or developed in the future. Moreover, a reference management module 304 may replace each copy of a reference that includes an associated reference counter using any suitable technique that is known or developed in the future.

In further embodiments, a reference management module 304 can delete a reference (e.g., a primary reference 402, a secondary reference 404, and/or tertiary reference 406, etc.) along with its associated reference counter stored in the storage system 106. In various embodiments, a reference and/or pointer (and its associated reference counter) can be deleted in response to determining that all duplicates and/or copies of the reference/pointer have been deleted or otherwise removed from the storage system 106 and that the reference/pointer has been deleted or is otherwise no longer valid. In other words, a reference and/or pointer can be deleted in response to determining that the reference/pointer has been deleted or is otherwise no longer valid and a reference counter associated with the reference/pointer has been decremented to zero and/or includes a value of zero.

A counter module 306 may include any suitable hardware and/or software that can control and/or manage one or more reference counters (e.g., a primary reference counter 406, secondary reference counter 412, tertiary reference counter 414, and/or quaternary reference counter 416). In various embodiments, a counter module 306 can increment a reference counter each time that a reference and/or pointer to the data 402 is generated to replace a copy/duplicate of the data 402 (e.g., primary reference counter 406) and/or each time that a reference and/or pointer to another reference/pointer is generated and/or created to replace a duplicate and/or copy of the other reference/pointer (e.g., secondary reference counter 412, tertiary reference counter 414, and/or quaternary reference counter 416, etc.). Further, a counter module 306 can decrement a reference counter each time that a reference and/or pointer to the data chunk 408 is deleted/removed (e.g., primary reference counter 406) and/or each time that a reference and/or pointer to another reference/pointer is deleted and/or removed (e.g., secondary reference counter 412, tertiary reference counter 414, and/or quaternary reference counter 416, etc.).

In some embodiments, a counter module 306 can increment a primary reference counter 406 associated with particular data 402 stored on the storage system 106 each time that a primary reference 404 that points and/or refers to the data 402 is created/generated to replace a copy of the data 402. Further, the counter module 306 can decrement the primary reference counter 406 each time that a primary reference 404 is deleted/removed from the storage system 106. The primary reference counter 406 can be utilized to track the quantity of copies of the data 402 that have been replaced by a primary reference 404.

In additional or alternative embodiments, a counter module 306 can increment a secondary reference counter 412 associated with a primary reference 404 each time that a secondary reference 408 is created/generated in the storage system 106 to replace a copy of the primary reference 404. Further, the counter module 306 can decrement the secondary reference counter 412 each time that a secondary reference 408 is deleted/removed from the storage system 106. The secondary reference counter 412 can be utilized to track the quantity of copies of the primary reference 404 that have been replaced by a secondary reference 408 (e.g., a copy of a copy).

In further additional or alternative embodiments, a counter module 306 can increment a tertiary reference counter 414 associated with a secondary reference 408 each time that a tertiary reference 410 is created/generated in the storage system 106 to replace a copy of the secondary reference 408. Further, the counter module 306 can decrement the tertiary reference counter 414 each time that a tertiary reference 410 is deleted/removed from the storage system 106. The tertiary reference counter 414 can be utilized to track the quantity of copies of the secondary reference 408 that have been replaced by a tertiary reference 410 (e.g., a copy, of a copy, of a copy).

A counter module 306 can continue incrementing and/or decrementing an associated reference counter (e.g., a quaternary reference counter 416, etc.) each time that a further reference to a reference is added and/or deleted, respectively, from the storage system 106 (e.g., a copy, of a copy, of a copy, of a copy . . . etc.). In other words, the various embodiments discussed herein are not limited to a primary reference counter 406, a secondary reference counter 412, a tertiary reference counter 414, and/or a quaternary reference counter 416).

In various embodiments, a counter module 306 abstains from incrementing the primary reference counter 406 when incoming data and/or data already stored in the storage system 106 ultimately references the data 402 and a reference counter for a reference is incremented. In other words, the counter module 306 does not increment the reference counter 406 when a copy of a copy of the data 402 is identified in the storage system 106 and/or is received for storage in the storage system 106.

With reference to FIGS. 4A and 4B, FIGS. 4A and 4B are block diagrams of one embodiment of a storage system 106 at example times Tn and T(n+x). The examples in FIGS. 4A and 4B are utilized to assist in understanding the concepts of the various embodiments and is not intended to limit the scope in any manner. Specifically, the examples in FIGS. 4A and 4B are intended to show that each of the copies of the data 402, whether a copy of the data 402 itself or a copy of a reference (e.g., a copy of a copy), reference and/or point to the data 402. Further, the example helps to clarify that a primary reference counter 406 is incremented when the copy is a copy of the data 402 itself or that a reference counter of a reference that ultimately references the data 402 is incremented when the copy is a copy of another reference (e.g., a copy of a copy, or so forth, etc.).

At least in the illustrated example of FIG. 4A, the storage system 106 is storing data 402 along with an associated primary reference counter 406 that tracks the quantity of primary references 404 that reference and/or point to the data 402 (e.g., number of copies of the data 402). Here, the primary reference counter 406 includes a value of one (1) because the storage system 106 is storing a single copy of the data 402 as the primary reference 404.

The primary reference 404 replaces an actual copy of the data 402 by providing a pointer to the data 402 instead of an actual copy of the data 402. Further, the primary reference counter 406 included an initial value of zero (0) and was incremented to the current value of 1 in response the primary reference 404 being created.

In addition, the primary reference 404 includes an associated secondary counter 412 that tracks the quantity of secondary references 408 that are copies of the primary reference 404, which is a copy of the data 402. Here, the secondary reference counter 412 includes a value of one (1) because the storage system 106 is storing a single copy of the primary reference 404 as the secondary reference 408.

The secondary reference 408 replaces an actual copy of the data 402 by providing a pointer to the data 402 instead of an actual copy of the data 402. Further, the secondary reference counter 412 in the primary reference 404 included an initial value of zero (0) and was incremented to the current value of 1 in response the secondary reference 404 being created.

Further, the secondary reference 408 includes an associated tertiary counter 414 that tracks the quantity of tertiary references 410 that are copies of the secondary reference 408, which is a copy of the primary reference 404, which is a copy of the data 402. Here, the tertiary reference counter 414 includes a value of one (1) because the storage system 106 is storing a single copy of the secondary reference 408 as the tertiary reference 410.

The tertiary reference 410 replaces an actual copy of the data 402 by providing a pointer to the data 402 instead of an actual copy of the data 402. Further, the tertiary reference counter 414 in the secondary reference 408 included an initial value of zero (0) and was incremented to the current value of 1 in response the tertiary reference 410 being created.

The tertiary reference 410 includes an associated quaternary reference counter 416 that tracks the quantity of quaternary references that are copies of the tertiary reference 410, which is a copy of the secondary reference 408, which is a copy of the primary reference 404, which is a copy of the data 402. In this example, the quaternary reference counter 416 includes a value of zero (0) because there are no copies of the tertiary reference 410 being stored on the storage system 106 at time TO. However, in the event that a copy of the tertiary reference 410 is received for storage in the storage system, the quaternary reference counter 416 will be incremented and a new reference (e.g., a quinary reference (not shown)) that points to the data 402 and includes an associated reference counter (e.g., a senary reference counter (not shown)) can be created.

Referring to FIG. 4B, FIG. 4B is a block diagram of the storage system 106 at a subsequent example time T(n+x). At least in the illustrated example of FIG. 4B, the storage system 106 is still storing data 402 along with the associated primary reference counter 406.

The storage system 106 is now storing two primary references 404 and 404A. Here, the primary references 404 and 404A both reference and/or point to the data 402. The primary reference counter 406 in the data 402 includes a value of two (2) because the primary references 404 and 404A are copies of the data 402. That is, the primary reference counter 406 was incremented one value when each of the primary references 404 and 404A was created.

The storage system 106 is further storing two secondary references 408 and 408A. Here, the secondary references 408 and 408A both reference and/or point to the data 402. The secondary reference counter 412 in the primary reference 404 includes a value of two (2) because the secondary references 408 and 408A are copies of the primary reference 404. That is, the secondary reference counter 412 was incremented one value when each of the secondary references 408 and 408A was created.

Further, the storage system 106 is storing two tertiary references 410 and 410A. Here, the tertiary references 410 and 410A both reference and/or point to the data 402. The tertiary reference counter 414 in the secondary reference 408 includes a value of two (2) because the tertiary references 410 and 410A are copies of the secondary reference 408. That is, the secondary reference counter 412 was incremented one value when each of the tertiary references 410 and 410A was created.

The tertiary reference counter 414A in the secondary reference 408A includes a value of zero (0) because the storage system 106 is not currently storing any copies of the secondary reference 408A. In other words, the storage system 106 is not currently storing tertiary references to the secondary reference 408A. However, when/if the storage system 106 receives a copy of the secondary reference 408A, a tertiary reference to the secondary reference 408A can be created, along with an associated quaternary reference counter for the tertiary reference.

The storage system 106 is further storing a single secondary reference 420. Here, the secondary reference 420 references and/or points to the data 402. A secondary reference counter 418 in the primary reference 404A includes a value of one (1) because the secondary reference 404A is a copy of the primary reference 404A. That is, the secondary reference counter 418 was incremented one value when the secondary reference 420 was created.

The secondary reference 420 includes a tertiary reference counter 422. The tertiary reference counter 422 includes a value of zero (0) because the storage system 106 is not currently storing any copies of the secondary reference 420. In other words, the storage system 106 is not currently storing tertiary references to the secondary reference 420. However, when/if the storage system 106 receives a copy of the secondary reference 420, a tertiary reference to the secondary reference 420 can be created, along with an associated quaternary reference counter for the tertiary reference.

Figure 5:
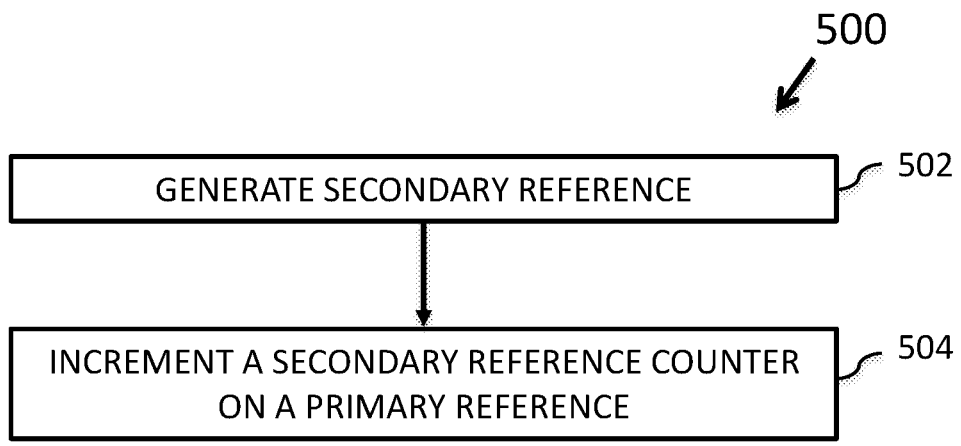
FIG. 5 is a schematic flow chart diagram illustrating one embodiment of a method for providing distributed data deduplication reference counting.

Referring to FIG. 5, FIG. 5 is a schematic flow chart diagram illustrating one embodiment of a method 500 for providing distributed data deduplication reference counting. At least in the illustrated embodiment, the method 500 can begin by a processor 204 generating a secondary reference 408 in response to a determination that a data chunk is a copy of a primary reference 404 (block 502).

The processor 204 further increments a secondary reference counter 412 on the primary reference 404 in response to a determination that the data chunk is a copy of the primary reference 404 (block 504). In various embodiments, the primary reference 404 includes a pointer to data 402 already stored on a storage system 106 and/or storage device 202.

Figure 6:
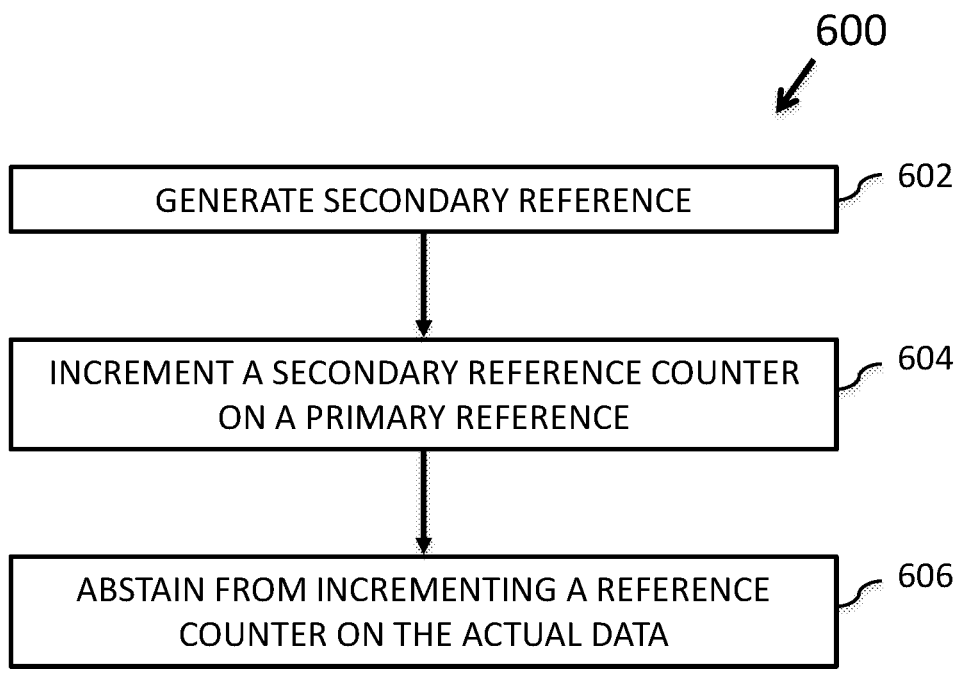
FIG. 6 is a schematic flow chart diagram illustrating another embodiment of a method for providing distributed data deduplication reference counting.

With reference to FIG. 6, FIG. 6 is a schematic flow chart diagram illustrating another embodiment of a method 600 for providing distributed data deduplication reference counting. At least in the illustrated embodiment, the method 600 can begin by a processor 204 generating a secondary reference 408 in response to a determination that a data chunk is a copy of a primary reference 404 (block 602). In various embodiments, the primary reference 404 includes a pointer to data 402 already stored on a storage system 106 and/or storage device 202.

The processor 204 further increments a secondary reference counter 412 on the primary reference 404 in response to a determination that the data chunk is a copy of the primary reference 404 (block 604). In addition, the processor 204 abstains from incrementing a primary reference counter 406 when the secondary reference 408 is generated (block 606).

Figure 7:
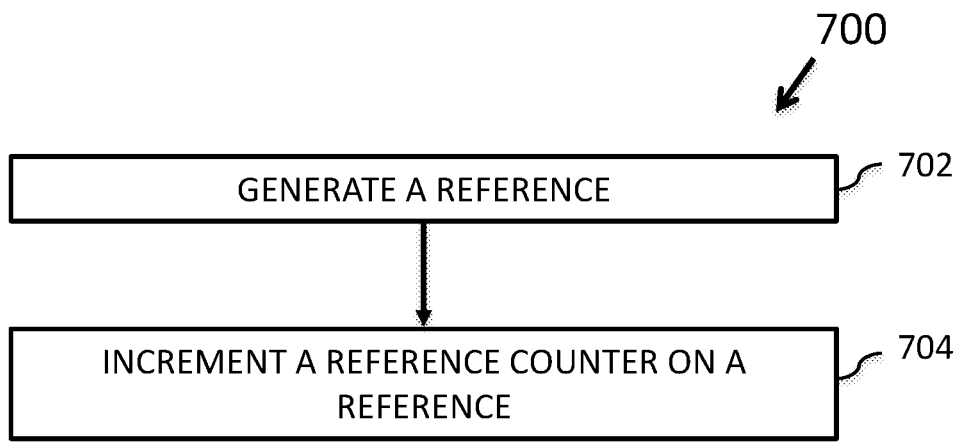
FIG. 7 is a schematic flow chart diagram illustrating yet another embodiment of a method for providing distributed data deduplication reference counting.

Referring to FIG. 7, FIG. 7 is a schematic flow chart diagram illustrating yet another embodiment of a method 700 for providing distributed data deduplication reference counting. At least in the illustrated embodiment, the method 700 can begin by a processor 204 generating a reference (e.g., secondary reference 408, tertiary reference 410, etc.) in response to a determination that a data chunk is a copy of data replaced by another reference (e.g., primary reference 404, secondary reference 408, etc.) (block 702).

The processor 204 increments a reference counter (e.g., primary reference counter 412, secondary reference counter 414, etc.) on the reference in response to a determination that the data chunk is a copy of the data replaced by another reference (block 704). In various embodiments, the reference includes a pointer to data (e.g., data 402) already stored on a storage system 106 and/or storage device 202.

Figure 8:
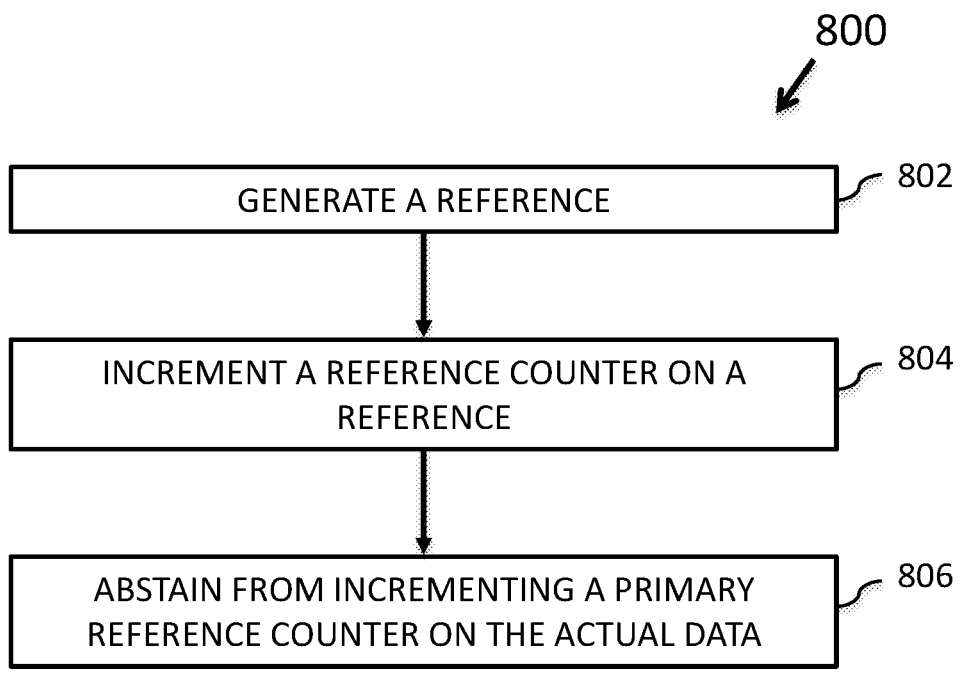
FIG. 8 is a schematic flow chart diagram illustrating still another embodiment of a method for providing distributed data deduplication reference counting.

With reference to FIG. 8, FIG. 8 is a schematic flow chart diagram illustrating yet another embodiment of a method 800 for providing distributed data deduplication reference counting. At least in the illustrated embodiment, the method 800 can begin by a processor 204 generating a reference (e.g., secondary reference 408, tertiary reference 410, etc.) in response to a determination that a data chunk is a copy of data replaced by another reference (e.g., primary reference 404, secondary reference 408, etc.) (block 802).

The processor 204 increments a reference counter (e.g., primary reference counter 412, secondary reference counter 414, etc.) on the reference in response to a determination that the data chunk is a copy of the data replaced by another reference (block 804). In various embodiments, the reference includes a pointer to data (e.g., data 402) already stored on a storage system 106 and/or storage device 202. In addition, the processor 204 abstains from incrementing a primary reference counter 406 when the reference is generated (block 806).

Figure 9:
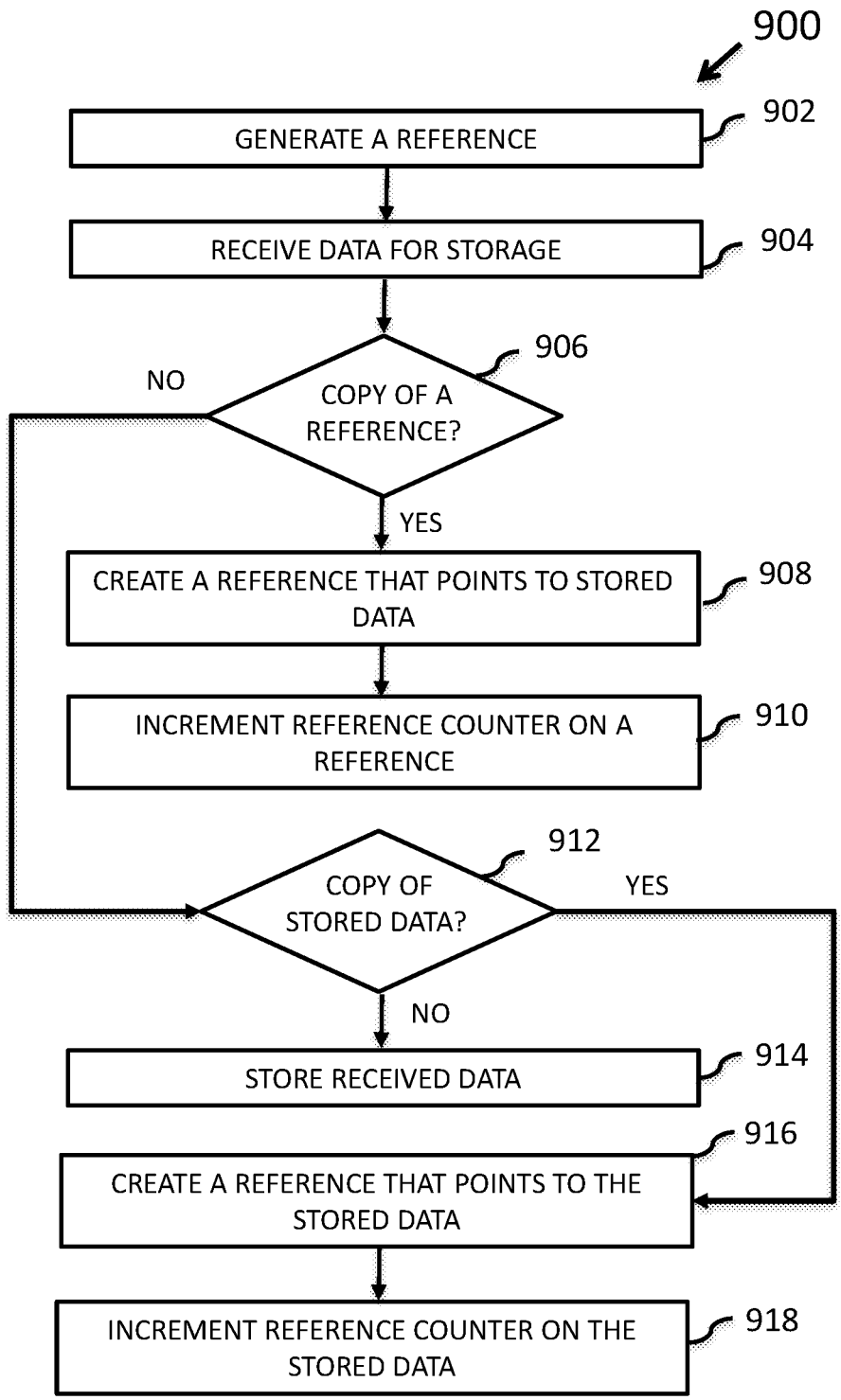
FIG. 9 is a schematic flow chart diagram illustrating a further embodiment of a method for providing distributed data deduplication reference counting.

Referring to FIG. 9, FIG. 9 is a schematic flow chart diagram illustrating a further embodiment of a method 900 for providing distributed data deduplication reference counting. At least in the illustrated embodiment, the method 900 can begin by a processor 204 generating a reference (e.g., secondary reference 408, tertiary reference 410, etc.) in response to a determination that a data chunk is a copy of data replaced by another reference (e.g., primary reference 404, secondary reference 408, etc. (e.g., a copy of a copy)) to the data 402 already stored on a storage system 106 and/or storage device 202 (block 902).

The processor 204 receives data for storage on the storage system 106 and/or storage device 202 (block 904). The processor 204 determines whether the received data is a copy of a reference (e.g., a copy of a copy) to the data 402 already stored on a storage system 106 and/or storage device 202 (block 906).

In response to the received data being a copy of a reference (e.g., a "YES" in block 906), the processor 204 creates a reference/pointer (e.g., a secondary reference 408) to the data 402 (block 908) and increments a reference counter (e.g., secondary reference counter 412) on the reference (e.g., primary reference 404) of which the received data is a copy (block 910). In response to the received data not being a copy of a reference (e.g., a "NO" in block 906), the processor 204 determines whether the received data is a copy of the data 402 already stored on a storage system 106 and/or storage device 202 (block 912).

In response to the received data not being a copy of the data 402 (e.g., a "NO" in block 912), the processor 204 stores the received data on storage system 106 and/or storage device 202 (block 914). In response to the received data being a copy of the data (e.g., a "YES" in block 912), the processor 204 creates another reference (e.g., primary reference 420) to the data 402 (block 916) and increments the reference counter 406 on the data 402 (block 918).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
a deduplication module that determines whether a first data chunk is a direct copy of an original data chunk or a copy of a direct copy of the original data chunk, wherein:
a direct copy defines a primary reference, and
a copy of a direct copy defines a secondary reference;
a reference management module that:
in response to determining that the first data chunk is a copy of a particular direct copy and is not a direct copy of the original data chunk, generates a new secondary reference, and
in response to determining that the first data chunk is a direct copy of the original data and is not a copy of a direct copy, generates a first additional primary reference, wherein the first additional primary reference is another direct copy of the original data chunk; and
a counter module that:
increments a respective secondary reference counter associated with the particular direct copy that the first data chunk is a copy of in response to generating the new secondary reference, and
increments the primary reference counter associated with the original data in response to generating the first additional primary reference,
wherein at least a portion of said modules comprises one or more of a set of hardware circuits, a set of programmable hardware devices, and executable code stored on a set of non-transitory computer-readable storage media.

2. The apparatus of claim 1, wherein:
the first additional primary reference comprises a first pointer to the original data chunk; and
the new secondary reference comprises a second pointer to the original data chunk.

3. The apparatus of claim 2, wherein:
the counter module is further configured to abstain from incrementing the primary reference counter associated with the original data chunk when the new secondary reference is generated.

4. The apparatus of claim 1, wherein:
the counter module is further configured to abstain from incrementing the primary reference counter associated with the original data chunk when the secondary reference is generated.

5. The apparatus of 4, wherein:
the reference management module is further configured to generate a second additional primary reference in response to a determination that a second data chunk is a further direct copy of the original data chunk; and
the counter module is further configured to increment the primary reference counter associated with the original data chunk in response to the second additional primary reference being generated.

6. A method, comprising:
determining, by a processor, whether a first data chunk is a direct copy of an original data chunk or a copy of one of a direct copy of the original data chunk, wherein:
a direct copy defines a primary reference, and
a copy of a direct copy defines a secondary reference;
generating, by the processor, a new secondary reference that is a copy of the first primary in response to determining that the first data chunk is a copy of a particular direct copy and is not a direct copy of the original data chunk;
generating, by the processor, a first additional primary reference in response to determining that the first data chunk is a direct copy of the original data and is not a copy of a direct copy, wherein the first additional primary reference is another direct copy of the original data chunk; and
incrementing, by the processor, a respective secondary reference counter associated with the particular direct copy that the first data chunk is a copy of in response to generating the new secondary reference; and
incrementing, by the processor, the primary reference counter associated with the original data in response to generating the first additional primary reference.

7. The method of claim 6, wherein:
the first additional primary reference comprises a first pointer to the original data chunk; and
the new secondary reference comprises a second pointer to the original data chunk.

8. The method of claim 7, wherein the method further comprises:
abstaining from incrementing the primary reference counter associated with the original data chunk when the secondary reference is generated.

9. The method of claim 6, wherein the method further comprises:
abstaining from incrementing the primary reference counter associated with the original data chunk when the secondary reference is generated.

10. The method of 9, further comprising:
generating a second additional primary reference in response to a determination that a second data chunk is a further direct copy of the original data chunk; and
incrementing the primary reference counter associated with the original data chunk in response to the second additional primary reference being generated.

11. A computer program product comprising a computer-readable storage medium including program instructions embodied therewith, the program instructions executable by a processor to cause the processor to:
determine whether a first data chunk is a direct copy of an original data chunk or a copy of a direct copy of the original data chunk, wherein:
a direct copy defines a primary reference, and
a copy of a direct copy defines a secondary reference;
generate a new secondary reference in response to determining that the first data chunk is a copy of a particular direct copy and is not a direct copy of the original data chunk;
generate a first additional primary reference in response to determining that the first data chunk is a direct copy of the original data and is not a copy of a direct copy, wherein the first additional primary reference is a another direct copy of the original data chunk;

increment a respective secondary reference counter associated with the particular direct copy that the first data chunk is a copy of in response to generating the new secondary reference; and increment the primary reference counter associated with the original data in response to generating the first additional primary reference.

12. The computer program product of claim 11, wherein:
the first additional primary reference comprises a first pointer to the original data chunk; and
the new secondary reference comprises a second pointer to the original data chunk.

13. The computer program product of claim 12, wherein the program instructions further cause the processor to:
abstain from incrementing the primary reference counter located associated with
the original data chunk when the secondary reference is generated.

14. The computer program product of claim 11, wherein the program instructions further cause the processor to:
abstain from incrementing the primary reference counter associated with the original data chunk when the secondary reference is generated.

15. The computer program product of 18, wherein the program instructions further cause the processor to:
generate a second additional primary reference in response to a determination that a second data chunk is a further direct copy of the original data chunk; and
increment the primary reference counter associated with the original data chunk in response to the second additional primary reference being generated.

16. The apparatus of claim 1, wherein:
each secondary reference includes a respective associated tertiary reference counter;
the deduplication module is further configured to determine whether the first data chunk is a copy of a copy of a direct of copy of the original data chunk in response to determining that the first data chunk is not a direct copy of the original data chunk and is not a copy of a direct copy;
the reference management module is further configured to generate a tertiary reference in response to a determination that the first data chunk is a copy of a copy of a direct of copy of the original data chunk; and
the counter module is configured to increment a respective tertiary reference counter associated with a particular secondary reference that the first data chunk is a copy of.

17. The method of claim 6, wherein:
each secondary reference includes a respective associated tertiary reference counter; and
the method further comprises:
determining whether the first data chunk is a copy of a copy of a direct of copy of the original data chunk in response to determining that the first data chunk is not a direct copy of the original data chunk and is not a copy of a direct copy,
generating a tertiary reference in response to a determination that the first data chunk is a copy of a copy of a direct of copy of the original data chunk, and
incrementing a respective tertiary reference counter associated with a particular secondary reference that the first data chunk is a copy of.

18. The computer program product of claim 11, wherein:
each secondary reference includes a respective associated tertiary reference counter; and
the program instructions further cause the processor to:
determine whether the first data chunk is a copy of a copy of a direct of copy of the original data chunk in response to determining that the first data chunk is not a direct copy of the original data chunk and is not a copy of a direct copy,
generate a tertiary reference in response to a determination that the first data chunk is a copy of a copy of a direct of copy of the original data chunk, and
increment a respective tertiary reference counter associated with a particular secondary reference that the first data chunk is a copy of.

* * * * *